United States Patent
Gateau (10) Patent No.: US 11,970,999 B2
(45) Date of Patent: Apr. 30, 2024

(54) ENGINE AIR FILTER UNIT FOR A VEHICLE

(71) Applicant: VOLVO CONSTRUCTION EQUIPMENT AB, Eskilstuna (SE)

(72) Inventor: Alexandre Gateau, Tresserve (FR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 442 days.

(21) Appl. No.: 17/287,816

(22) PCT Filed: Oct. 25, 2018

(86) PCT No.: PCT/EP2018/079272
§ 371 (c)(1),
(2) Date: Apr. 22, 2021

(87) PCT Pub. No.: WO2020/083489
PCT Pub. Date: Apr. 30, 2020

(65) Prior Publication Data
US 2021/0381474 A1    Dec. 9, 2021

(51) Int. Cl.
*F02M 35/02* (2006.01)
*B01D 45/06* (2006.01)
(Continued)

(52) U.S. Cl.
CPC ......... *F02M 35/0216* (2013.01); *B60K 13/02* (2013.01); *F02M 35/0202* (2013.01);
(Continued)

(58) Field of Classification Search
None
See application file for complete search history.

(56) References Cited

U.S. PATENT DOCUMENTS 5,034,036 A   7/1991 Creek et al.
6,484,835 B1*  11/2002 Krapfl .................. F02M 35/164
                                                          123/195 C
(Continued)

FOREIGN PATENT DOCUMENTS

CN    201739042 U   2/2011
CN    203809164 U   9/2014
(Continued)

OTHER PUBLICATIONS

Chinese Office Action dated May 7, 2022 in corresponding Chinese Patent Application No. 201880098927.X, 15 pages.
(Continued)

*Primary Examiner* — Gabriel E Gitman
(74) *Attorney, Agent, or Firm* — Venable LLP; Jeffri A. Kaminski (57) ABSTRACT

The invention relates to an engine air filter unit for a vehicle (1) that is designed to supply filtered air to an internal combustion engine of the vehicle (1). The engine air filter unit (10) comprises a main filter (14), a mounting base (15) to secure the engine air filter unit (10) on at least one body panel (7, 71, 72) of the vehicle, a pre-separator fluidically connected to the main filter. The main filter (14) is arranged on a side of the mounting base (15) and the pre-separator (18) is arranged on the opposite side of the mounting base (15). The pre-separator housing is at least partly formed by the mounting base (15) and an air duct (19) extends through the mounting base (15) to fluidically connect the pre-separator to the filtration chamber.

25 Claims, 4 Drawing Sheets

(51) Int. Cl.
*B60K 13/02* (2006.01)
*F02M 35/024* (2006.01)
*F02M 35/04* (2006.01)
*F02M 35/10* (2006.01)
*F02M 35/12* (2006.01)
*B01D 46/00* (2022.01)
*F02M 35/022* (2006.01)
*F02M 35/16* (2006.01)

(52) U.S. Cl.
CPC .... *F02M 35/02416* (2013.01); *F02M 35/048* (2013.01); *F02M 35/10242* (2013.01); *F02M 35/1272* (2013.01); *B01D 45/06* (2013.01); *B01D 46/0005* (2013.01); *B01D 46/001* (2013.01); *F02M 35/0226* (2013.01); *F02M 35/164* (2013.01)

(56) References Cited

U.S. PATENT DOCUMENTS

| | | | | |
|---|---|---|---|---|
| 2010/0301638 A1* | 12/2010 | Hinshaw | ............ | F02M 35/164 296/208 |
| 2012/0017551 A1 | 1/2012 | Greif | | |
| 2015/0275831 A1* | 10/2015 | Chlystek | ............ | F02M 35/164 55/337 |
| 2016/0151731 A1 | 6/2016 | Crary et al. | | |
| 2017/0089307 A1* | 3/2017 | Arai | ............ | F02M 35/02416 |
| 2017/0259529 A1* | 9/2017 | Brinkman | ............ | B23K 20/04 |

FOREIGN PATENT DOCUMENTS

| | | |
|---|---|---|
| CN | 207875381 U | 9/2018 |
| FR | 2605271 A1 | 4/1988 |
| JP | S6084126 A | 5/1985 |

OTHER PUBLICATIONS

International Search Report and Written Opinion dated Jun. 26, 2019 in corresponding International PCT Application No. PCT/EP2018/079272, 10 pages.

* cited by examiner

ENGINE AIR FILTER UNIT FOR A VEHICLE

CROSS-REFERENCE TO RELATED APPLICATIONS

This application is a U.S. National Stage application of PCT/EP2018/079272, filed Oct. 25, 2018, and published on Apr. 30, 2020, as WO 2020/083489 A1, all of which is hereby incorporated by reference in its entirety.

TECHNICAL FIELD

The invention relates to a vehicle having an internal combustion engine assembly comprising an engine and an air inlet circuit feeding in air the internal combustion engine and comprising an engine air filter to trap particles contained in the air drawn from the outside by the air inlet circuit.

BACKGROUND

A vehicle such as a truck or a construction equipment machine may be driven or may operate in a very dirty area such as a working or a construction area. It is a reason why such a vehicle is generally provided with an air engine pre-separator arranged upstream main air engine filter. The air engine pre-separator is generally designed to trap bigger particles than the particles trapped by the main air filter. In the field of air filtration, pre-separator is also known as pre-cleaner or pre-filter and filter is also known as cleaner or separator.

To realize this function of pre-filtration or pre-separation in addition of a main filtration it is known to provide two filters arranged in series into two separated and distant housings. Owing to packaging issues, more compact air engine filter unit are also known such as the solution disclosed in US2012017551 wherein an engine air filter unit is provided with one housing comprising a pre-separator, a first filter element and second filter element. Even if the overall dimensions of such air engine filter unit is more optimized compared to more conventional arrangement comprising two filter housings, such an air engine filter unit still occupy a lot of space in the engine compartment.

SUMMARY

An object of the invention is to provide an improved air engine filter unit for a vehicle, in particular an improved air engine filter unit comprising a pre-separator and a main filter that 30 occupy less space in an engine compartment.

To that end, and according to a first aspect, the invention concerns an air engine filter unit for a vehicle. Said air engine filter unit is designed to supply filtered air to an internal combustion engine of the vehicle. The engine air filter unit comprises:
  a main filter having
    a filter housing delimiting inside a filtration chamber of the main filter,
    a filter element arranged inside the filtration chamber,
  a mounting base connected to the filter housing of the main filter in order to secure the engine air filter unit on at least one body panel of the vehicle,
  a pre-separator fluidically connected to the main filter, arranged upstream from the main filter and comprising a pre-separator housing which is at least partially closed,
  an air duct fluidically connecting the pre-separator to the filtration chamber.

The main filter and the pre-separator are arranged such that main filter is arranged on a side of the mounting base and the pre-separator is arranged on the opposite side of the mounting base. The pre-separator housing is at least partly formed by the mounting base. The air duct extends through the mounting base to fluidically connect the pre-separator to the filtration chamber.

By providing a pre-separator housing that is partly formed by the mounting base of the air engine filter unit and wherein the pre-separator is arranged on a side of the mounting base that is opposite to the main filter, the pre-separator lies along the mounting base with limited impact on the overall dimensions of the air engine filter unit. The invention makes it possible to save space in the engine compartment, especially in the vicinity of the air engine filter unit.

Some advantageous but optional features of the invention, considered on their own or in any technically feasible combination, are given below.

According to an advantageous embodiment of the invention the pre-separator housing is partly formed by the mounting base and by side walls that extend from the mounting base in a direction opposite to the main filter. Preferably, the side walls extend perpendicularly from at least one outer surface of the mounting base, wherein the outer surface is on a side of the mounting base that is opposite to the side where is arranged the main filter. This specific arrangement provides a compact air engine filter unit that is also quite simple to manufacture.

Said at least one outer surface of the mounting base can be a flat surface, a curve surface, can also be formed by several flat surfaces inclined relative to each other or a succession of flat and curve surfaces. Thanks to these possible variations of shapes of said at least one outer surface, the design of the pre-separator can be adjusted to any shape of the body panel of the vehicle.

The mounting base can be formed by at least one mounting plate. This advantageous design represents a simple manner to manufacture the mounting base and therefore the air engine filter unit according to the invention.

In another and advantageous way to manufacture the mounting base, the filter housing can be made of at least one plastic part or can be made of at least one light metallic alloy part. In this case the mounting base is preferably formed as a single piece with the plastic part or light metallic alloy part. This further advantageous design represents another simple manner to manufacture the mounting base and therefore the air engine filter unit according to the invention.

In an alternative, the pre-separator housing is closed, irrespective of its air inlet and its air outlet, by at least one opposite wall that is facing to at least one outer surface of the mounting base and that lies parallel to the outer surface of the mounting base. In this case, the side walls extend from the outer surface of the mounting base to the opposite wall.

According to a first option of said alternative, the opposite wall has an outer surface opposite to the mounting base that is designed to fit with an inner shape of at least one body panel of the vehicle. The outer surface of the opposite wall has preferably the same shape as the inner shape of the body panel of the vehicle. These particular features according to said first option, allow the pre-separator and therefore the whole air engine filter unit according to the invention being designed very compact.

According to a second option of said alternative, the opposite wall can form a body panel of the vehicle. This second design option allows the pre-separator and therefore the whole air engine filter unit according to the invention being designed very compact with beneficial impact on the cost to manufacture the vehicle body.

According to another alternative to form the pre-separator housing, the pre-separator housing is designed to be closed, irrespective of its air inlet and its air outlet, only when the engine air filter unit is secured on said at least one body panel of the vehicle. Indeed, according to this other alternative, before being secured on said at least one body panel of the vehicle, the pre-separator housing is opened on a side that is facing the mounting base and when it is secured on said at least one body panel, the pre-separator housing is closed, irrespective of its air inlet and its air outlet, by said at least one body panel of the vehicle. In this case, the body panel contacts side walls of the pre-separator housing such that the side walls extend from the mounting base to the body panel.

This second alternative represents a compact arrangement and a simple way to manufacture the pre-separator and therefore the engine air filter unit of the invention.

According to this other alternative, when the engine air filter unit is secured on the body panel of the vehicle, the body panel forms an opposite wall of the pre-separator housing that is facing to the outer surface of the mounting base and that preferably lies parallel to the outer surface of the mounting base. This arrangement allows the pre-separator being design very compact.

Advantageously and whatever the previous alternative, the outer surface of the mounting plate has the same shape as the opposite wall.

Advantageously, air inlet of the pre-separator is formed in the opposite wall and an outlet of the pre-separator is formed by an opening of the connecting duct that opens inside the pre-separator housing.

In a preferred embodiment, the mounting base comprises at least two outer surfaces facing to two opposite walls. The two opposite walls are inclined relative to each other with an angle comprises between 90 and 180° and the outer surfaces are inclined relative to each other with the same angle as the opposite walls.

In an advantageous arrangement, the pre-separator comprises, inside the pre-separator housing, a particle separating device to trap particles contained in the air flow that is flowing through the pre-separator.

Advantageously, the particle separating device comprises a channel arranged between the air inlet) and the air outlet of the pre-separator and at least one chicane to deviate the air flow flowing through the channel. The chicane can be formed by at least one inside separator wall extending from the mounting base to the opposite wall.

Advantageously, the side walls and the inside separator wall are formed by noise insulating material such as polyurethane foam. Preferably, the side walls and the inside separator wall are resiliently deformable in a compression.

For compactness purpose, the pre-separator housing has preferably a thickness measured between the outer surface of the mounting base and the opposite wall that is at least five times lower than its width or its length measured according to a direction that is parallel to the outer surface of the mounting base.

According to a further aspect, the invention relates to a vehicle comprising:
an internal combustion engine,
an engine air filter unit such as previously described,
an engine compartment wherein the internal combustion engine and said engine air filter unit are arranged.

The engine compartment is at least partially delimited by at least one body panel of the vehicle. The engine air filter unit is secured to the at least one body panel via its mounting base. The pre-separator housing is at least delimited by the mounting base, by said at least one body panel and by side walls extending from the mounting base to said at least one body panel.

This vehicle arrangement represents a compact and simple way of manufacturing an engine air filter unit such as previously described due to the fact that main walls of the pre-separator housing are provided by mounting base and by body panel(s) of the vehicle.

Advantageously, the pre-separator is arranged in a corner inside the engine compartment. Said corner is formed at the junction of at least a first body panel portion and a second body panel portion. The first body panel portion and the second body panel portion are inclined relative to each other and delimit at least partially the engine compartment, wherein the pre-separator housing is at least delimited by:
the mounting base,
the first body panel portion and the second body panel portion,
the side walls that extend from the mounting base to the first and second body panel portions.

The first body panel portion and the second body panel portion belong to the same body panel or belong to two different body panels.

Advantageously, the mounting base comprises a first outer surface and a second outer surface facing respectively to the first body panel portion and to the second body panel portion. The first outer surface and the second outer surface are inclined relative to each other with the same angle as the angle of inclination between the first body panel portion and the second body panel portion. Preferably, the first body panel portion and the second body panel portion are inclined relative to each other with an angle comprises between 90 and 180°.

Advantageously, the outlet of the pre-separator is formed in the first outer surface of the mounting base that is facing to the first body panel portion and the inlet of the pre-separator is formed in the second body panel portion.

In an advantageous arrangement, the pre-separator comprises, inside the pre-separator housing, a particle separating device to trap particles contained in the air flow that is flowing through the pre-separator.

Advantageously, the particle separating device comprises a channel arranged between the air inlet) and the air outlet of the pre-separator and at least one chicane to deviate the air flow flowing through the channel. The chicane can be formed by at least one inside separator wall extending from the mounting base to the opposite wall.

Advantageously, the side walls and the inside separator wall are formed by noise insulating material such as polyurethane foam. Preferably, the side walls and the inside separator wall are resiliently deformable in a compression.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

FIGS. 1 to 6 represent an embodiment of the invention.

Figure 1:
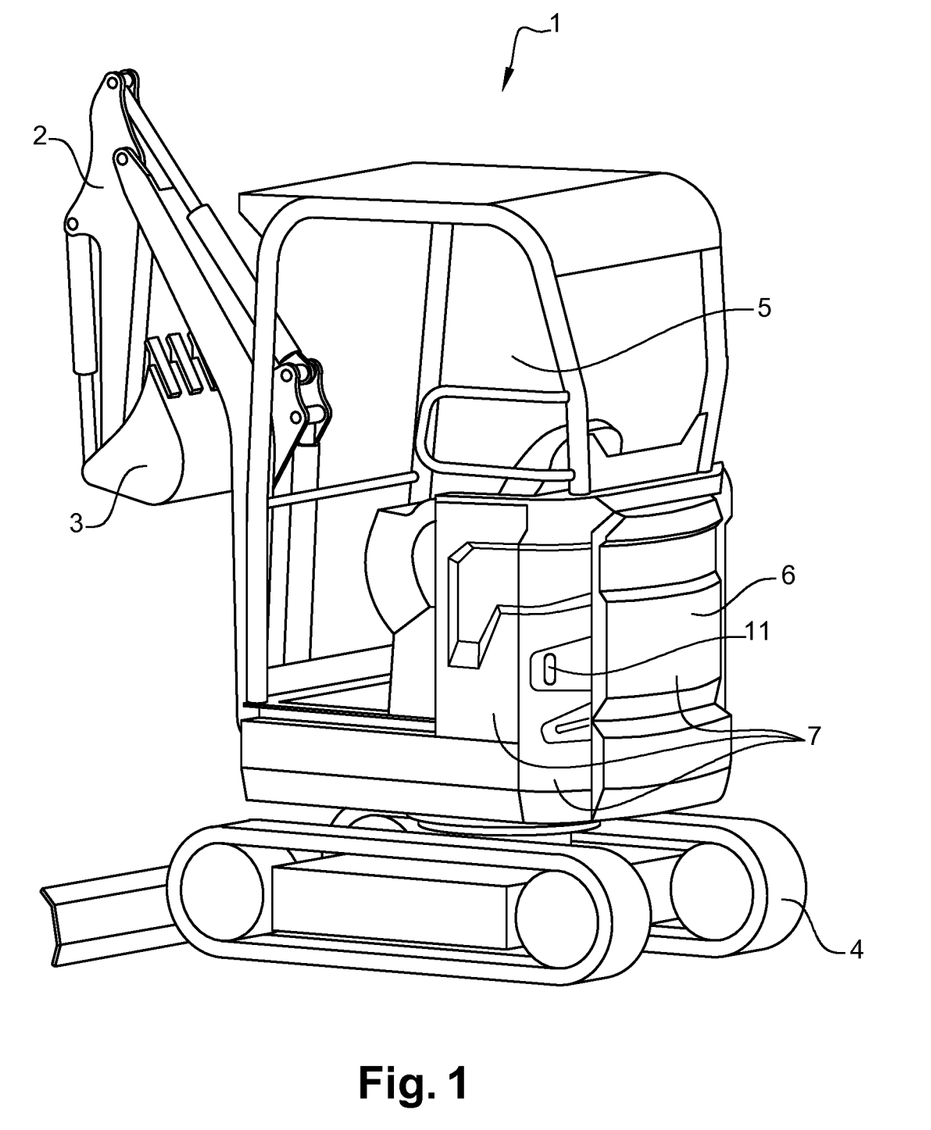
FIG. 1 is a side view of a vehicle comprising engine air filter unit according to the invention.

FIG. 1 shows a vehicle comprising an engine air filter unit according to the invention.

In the example of FIG. 1, the vehicle 1 is a construction equipment machine equipped with a backhoe digging apparatus 2. To the end of the backhoe digging apparatus 2 is fixed a bucket 3.

Figures 2, 3:
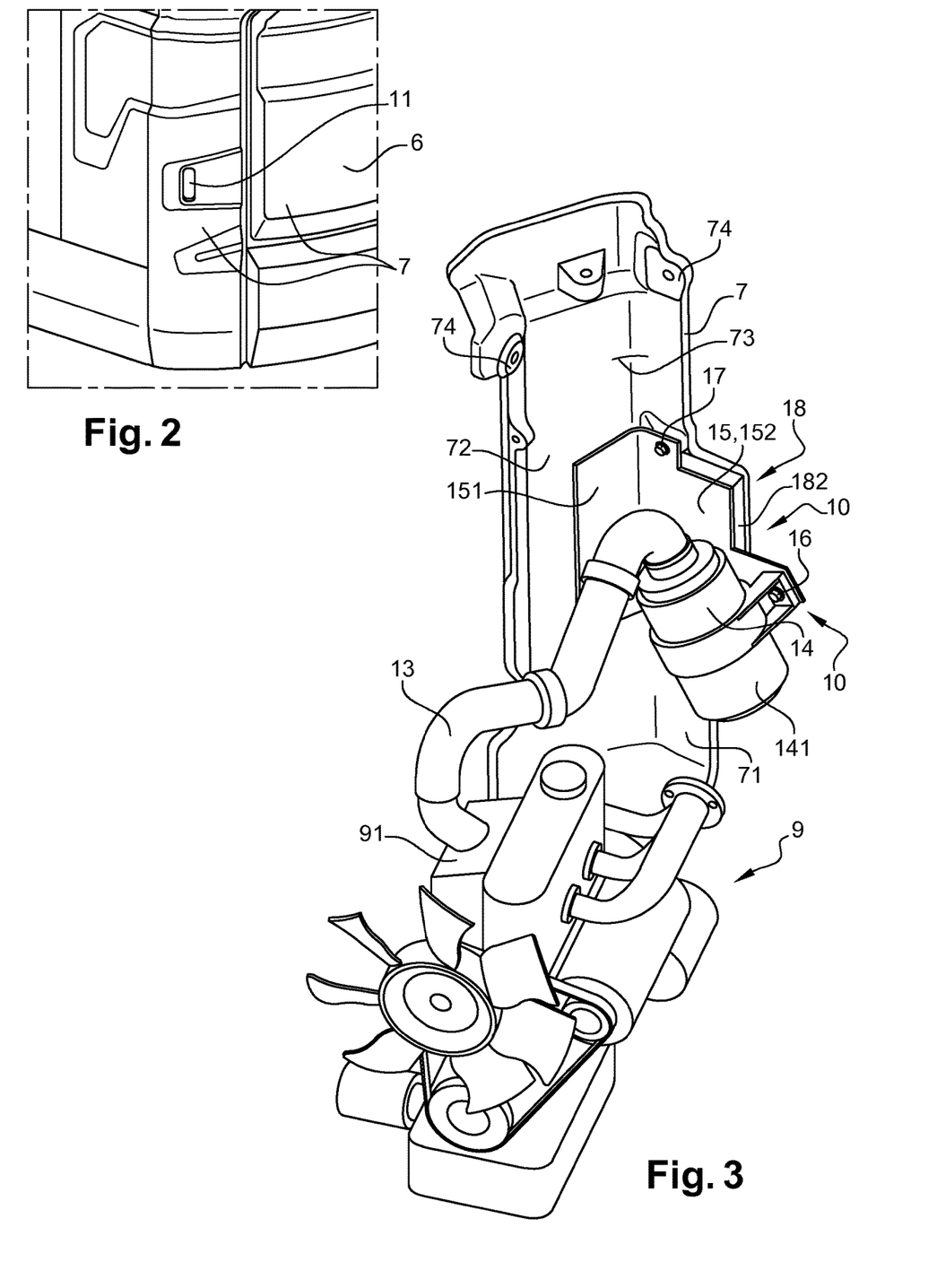
FIG. 2 is a magnification of the rear of the vehicle of FIG. 1 showing the outside of the engine compartment and that is centered on the air inlet for the engine air filter unit.
FIG. 3 is a view of the inside of the engine compartment of the vehicle of FIG. 1 that shows an internal combustion engine and an engine air filter unit according an embodiment of the invention.

Such a vehicle 1 is driven and powered by an internal combustion engine 9 arranged in an engine compartment 6 of the vehicle 1 (FIG. 3). The vehicle also comprises in the engine compartment 6 an engine air filter unit 10 that is designed to supply filtered air to the internal combustion engine 9.

The present invention is not limited to the use in a construction equipment machine and may be used in any other vehicles provided with an internal combustion engine and an engine air filter unit arranged in the engine compartment.

The internal combustion engine 9 draws, via the engine air filter unit 10, fresh air from the outside of the engine compartment 6. To this end the engine air filter unit 10 comprises an air inlet 11 that is formed in a body panel 7 of the vehicle 1 such as represented on FIGS. 2 and 3. Fresh air may contain particles such as dust particles and water droplets that may be detrimental for the performances of the internal combustion engine 9, that's why there is a need to clean fresh air. To clean fresh air, the engine air filter unit 10 according to the invention comprises a main filter 14 such as represented on FIGS. 3, 4 and 6. Such a main filter 14 conventionally comprises:
  a filter housing 141 which delimits inside a filtration chamber 142 (FIG. 4),
  a filter element arranged 143 inside the filtration chamber 142.

Figure 4:
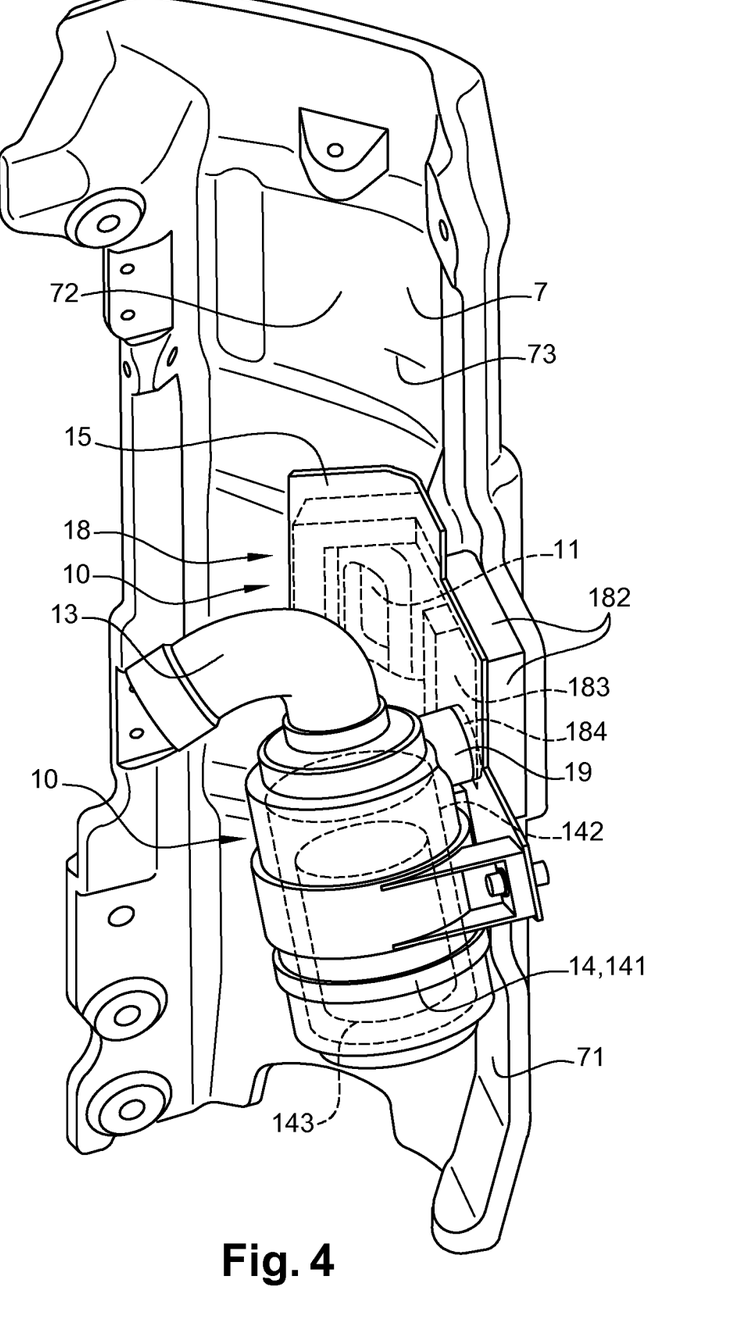
FIG. 4 is a different view of engine air filter unit of FIG. 3 wherein the internal combustion engine is not represented.

The filter element 143 is made of a pleated filter medium preferably configured in the shape of a cylinder such as represented on FIG. 4 or in the shape of a panel (not shown).

The engine air filter unit 10 also comprises a pre-separator 18 that is also known as a pre-filter or a pre-cleaner. Downstream from the main filter 14, the engine air filter unit 10 may comprise a hose 13 to direct the air to the inlet manifold 91 of the internal combustion engine 9.

The pre-separator 18 is arranged upstream from the main filter 14. The pre-separator 18 is fluidically connected to the main filter 14 through an air duct 19 (represented on FIGS. 4, 5 and 6). More specifically, the air duct 19 is fluidically connected between the pre-separator 18 and the filtration chamber 142 of the main filter 14. The function of the pre-separator 18 is generally to trap bigger particles than the particles trapped by the main air filter 14 and to trap water droplets from the outside. Pre-separator 18 is especially useful for vehicles, such as construction equipment vehicles, that operates or that are driven in working areas wherein ambient air contains a lot of dust particles and where droplets can be projected up to the air inlet of the vehicle and drawn by the engine air filter unit 10.

The engine air filter unit 10 is secured to at least one body panel 7 of the vehicle 1 via a mounting base 15. This mounting base 15 belongs to the engine air filter unit 10 and is connected to the filter housing 141 of the main filter 14. The filter housing 141 is connected to the mounting base 15 via, for instance, screws 16 and the mounting base 15 is secured to said at least one body panel 7 via, for instance, screws 17.

A Body panel 7 of the vehicle is attached to other body panels or to the frame of the vehicle via attachment devices located at points of attachments 74 of the body panel 7. Attachment devices can be, for instance, screws, welding, clips or rivets.

A simple way of manufacturing the mounting base 15 consists in making it with at least one mounting plate. In the embodiment of FIGS. 3 to 6, the mounting base 15 is realized by a mounting plate that is bent to fit the shape of a corner 73 inside the engine compartment 6. Such as illustrated in FIG. 3, the mounting plate 15 comprises therefore two plate portions 151, 152 connected together with an inclination angle α between them. In a non-represented variant, the mounting base 15 can be realized by at least two plates 151, 152 welded together. In another non-represented variant the mounting base 15 could be a die casting part made, for instance, of aluminum alloy.

In a variant, the filter housing 141 is made of at least one plastic part or is made of at least one light metallic alloy part and the mounting base is formed as a single piece with the plastic part or light metallic alloy part. A preferred light metallic alloy is, for instance, an aluminum alloy.

According to the invention the main filter 14 is arranged on a side of the mounting base 15 and the pre-separator 18 is arranged on the opposite side of the mounting base 15, that is to say on the side 186, 187 of the mounting base 15 that is opposite to the main filter 14. According to a further advantageous characteristic of the invention, the pre-separator housing 18 is formed by at least the mounting base 15. The air duct 19 connecting the pre-separator 18 to the filtration chamber 142 extends through the mounting base 15.

Thanks to this specific arrangement according to the invention, an engine air filter unit 10 that comprises a pre-separator and a main filter can be designed very compact and may occupy less space in the engine compartment than arrangements of prior art. In addition, having a part of the pre-separator 18 housing partly formed by the mounting base 15 makes the engine air filter unit 10 quite simple and less expensive to manufacture.

Figure 6:
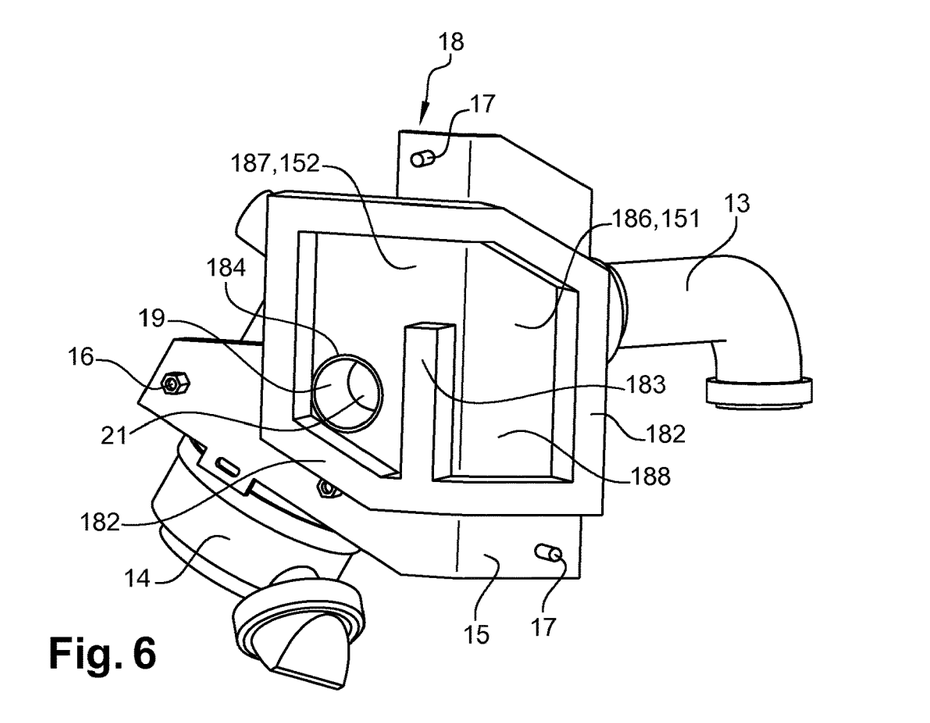
FIG. 6 represents the pre-separator of FIG. 5 with the mounting base but without the body panel of the vehicle and according to a view direction that is different from the view direction of FIG. 5.

In a first alternative such as represented in FIG. 6 the engine air filter unit 10 is manufactured such that, before being assembled in the engine compartment 6 of the vehicle 1, the pre-separator housing 18 is not totally closed. In this case, before being assembled in the engine compartment 6, the pre-separator housing 18 is partly formed by the mounting base 15 and by side walls 182 that extend from the mounting base 15 in a direction opposite to the main filter 14. According to this first alternative and before being assembled in the engine compartment 6, the pre-separator housing 18 is therefore opened, irrespective of its air inlet and its air outlet, in a direction opposite to the mounting base 15.

Advantageously and such as represented on FIG. 6, side walls 182 extend perpendicularly from at least one outer surface 186, 187 of the mounting base 15. The outer surface 186, 187 is on a side of the mounting base 15 that is opposite to the side of the mounting base 15 where is connected the main filter 14.

When the engine air filter unit 10 is assembled in the engine compartment 6 and secured to at least one body panel 7 of the engine compartment 6, the pre-separator 18 is closed, irrespective of its air inlet and its air outlet, by the body panel 7 of the vehicle. The body panel 7 contacts side walls 182 of the pre-separator housing 18 such that the side walls 182 interconnect the mounting base 15 to the body panel 7.

When the engine air filter unit 10 is secured on the body panel 7 of the vehicle, the body panel 7 forms a opposite wall of the pre-separator housing 18 that is facing to the outer surface 186, 187 of the mounting base 15 and that lies parallel to the outer surface 186, 187 of the mounting base 15.

Using the body panel 7 of the vehicle to close the housing of the pre-separator 18 allows the pre-separator 18, and then the engine air filter unit 10, being designed very compact. Besides, the engine air filter unit 10 according to the invention is less expensive to manufacture compared to an engine air filter unit 10 of the prior part that comprises a conventional pre-separator. Indeed, forming the housing of a pre-separator according to the invention requests to only add side walls 182 to the mounting base of a main filter.

In the embodiment of FIGS. 2 to 6, the mounting base 15 and the pre-separator are arranged in a corner 73 of the inside of the engine compartment 6. The corner 73 is formed at the junction of at least two body panel portions of the vehicle, a first one 71 and a second one 72 that are inclined relative to each other to form the corner 73 inside the engine compartment 6. The first and the second body panel portions form two opposite walls 71, 72 of the pre-separator 18 and can belong to the same body panel or to two different body panels of the vehicle. The mounting base 15 comprises in this case two outer surfaces, a first outer surface 187 and a second outer surface 186 facing respectively to the first body panel portion 71 and to the second body panel portion 72. The first outer surface 187 and the second outer surface 186 are inclined relative to each other with the same angle as the first body panel portion 71 and the second body panel portion 72 and lies parallel respectively to the first body panel portion 71 and to the second body panel portion 72. In other words, when the engine air filter unit 10 is assembled in the engine compartment 6, irrespective of the air inlet and air outlet of the pre-separator 18, the housing of the pre-separator 18 is closed by both body panel portions 71, 72 of the vehicle.

The fact that the pre-separator 18 is formed in a corner 73 of the engine compartment 6 allows saving more space in the engine compartment. Indeed, it is generally difficult to take full advantages of corners inside an engine compartment 6 and corners are often quite difficult to use for engine equipment location. That's why arranging the pre-separator 18 in a corner of the engine compartment allows optimal use of the space inside the engine compartment 6.

On FIGS. 2 to 6, the outer surfaces 186, 187 of the mounting base 15 are flat surfaces. In a variant (not shown) the mounting base only comprises one outer surface that is a flat surface, such a shape is preferred when the pre-separator is, for instance, arranged near a body panel of the vehicle that is flat shaped. In another variant the outer surface of the mounting base is curve, such a shape is preferred when the pre-separator is for instance, arranged near a curved body panel of the vehicle. In a further variant (not shown), the mounting base 15 comprises several outer surfaces arranged with a succession of flat and curve surfaces. Due to the fact that the outer surface of the mounting base 15 may be configured according to different shapes, the pre-separator 18 can easily be designed with a relative flat shape that fits with a flat, a curve or a corner inside shape of a body panel of the vehicle.

According to a non-represented second alternative the pre-separator housing is closed during the manufacturing process, irrespective of its air inlet and air outlet, by an opposite wall that is part of the engine air filter unit, that is facing to the outer surface of the mounting base and that lies parallel to the outer surface of the mounting base. As in the first alternative, the side walls extend from the outer surface of the mounting base to the opposite wall.

In the second alternative and according to a first option the opposite wall has an outer surface opposite to the mounting base that is designed to fit with an inner shape of a body panel of the vehicle. In other words, the outer surface of the opposite wall has the same shape as the inner shape of the body panel of the vehicle.

In the second alternative and according to a second option the opposite wall forms a body panel of the vehicle. According to this second option the opposite wall is attached to other vehicle body panels or to some parts of the vehicle frame, for instance, by means of screws, welding, clips or rivets.

The following parts of the description relate more specifically to the inside arrangement of the pre-separator 18.

Figure 5:
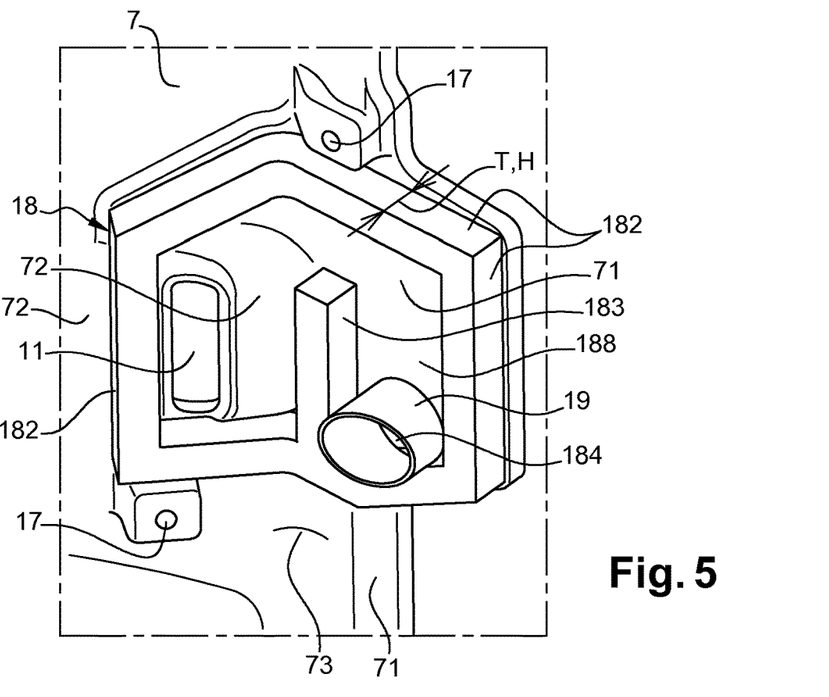
FIG. 5 is a view of a pre-separator of the engine air filter unit according to the invention without the mounting base and without the main air filter.

Preferably and such as represented on FIG. 5, the air inlet 11 of the pre-separator 18 is formed in the opposite wall 72 and the outlet of the pre-separator 18 is formed by an opening 184 of the connecting duct 19 which opens inside the pre-separator housing 18.

When the pre-separator 18 is arranged in a corner 73 of the engine compartment the outlet 184 of the pre-separator is formed in the outer surface 187 of the mounting base 15 that is facing to the first opposite wall 71 and the inlet 11 of the pre-separator 18 is formed in the second opposite wall 72. According to the first alternative the first opposite wall 71 is the first body panel portion 71 and the second opposite wall 72 is the second body panel portion 72 of the vehicle.

The pre-separator 18 comprises, inside the pre-separator housing, a particles separating device 183 to trap particles contained in the air flow that is flowing through the pre-separator.

According to a preferred implementation such as represented on FIGS. 5 and 6, the particle separating device is realized by a channel 188 arranged between the air inlet 11 and the air outlet 184 of the pre-separator and by at least one chicane 183 to deviate the air flow flowing through the channel 188. The chicane is advantageously formed by at least one inside separator wall 183 extending from the mounting base 15 to the opposite wall 71.

The chicane arrangement 183 allows heavy particles being trapped in the pre-separator. Heavy particles can be particles of dust and/or water droplets.

A particle separating device when realized by at least one chicane 183 arranged in the channel 188 is particularly suitable for a separator housing having a substantially flat and thin shape. Indeed, the chicane arrangement 183 located in the channel 188 constitutes an efficient particles separating device when arranged in a pre-separator housing having a substantially flat and thin shape.

As a consequence, by the use of at least one chicane 183 arranged in the channel 188, an efficient particle separating effect can be achieved even if the pre-separator housing 18 has a substantially flat and thin shape.

For compactness reason the pre-separator housing 18 is preferably designed with a substantially flat and thin shape. In the present application, the pre-separator 30 housing is considered as having a substantially flat and thin shape when, the thickness T of the pre-separator housing 18 measured between the outer surface 186, 187 of the mounting base and the opposite wall 71, 72 is at least five times lower than the width or the length of the pre-separator housing measured according to a direction that is parallel to the outer surface 186, 187 of the mounting base 15. The thickness T also corresponds to the height H of the side walls 182 between the outer surface of the mounting base and the opposite wall.

According to a non-represented variant, the particle separating device is formed by a filter medium located in a filtration chamber delimited by the pre-separator housing. Preferably the filter medium is pleated and configured in the shape of a panel that divides the filtration chamber into an upstream portion (un-filtered area) and a downstream portion (filtered area). According to this variant the particles are trapped by the filter medium, in the upstream portion of the filtration chamber, when air is flowing through the filter medium. Preferably, the filter medium is a water repellent medium able to retain water droplets in the upstream portion of the filtration chamber.

Preferably, the side walls 182 and the inside separator wall 183 are formed by noise insulating material such as polyurethane foam. Such a material can be advantageously used for noise attenuation coming from the engine. When the vehicle 1 is used in an urban area, noise produced by the vehicle especially by the engine 9 can be very uncomfortable for people walking or living in the vicinity of the vehicle. Inventors have identified that noise generated by the engine 9 could be propagated by the engine air filter unit 10 up to the inlet 11.

The use of noise insulating material to realize the side walls 182 and the inside separator wall 183 associated to the inside design of the pre-separator 18 with chicane 183 contributes further to the attenuation of noise emitted by the engine via the engine air filter unit.

When made of plastic material, such polyurethane foam, side walls 182 can be, for instance, stuck on the outer surface 186, 187 of the mounting base.

As previously explained, the pre-separator 18 can be arranged in a corner 73 in the inside of the engine compartment 6 and is configured with a flat shape following the inside curve or inside shape of the corner 73. According to this particular arrangement, the mounting base comprises two outer surfaces 186, 187 facing to two opposite walls 71, 72 that are inclined to one to another. The junction between two body panels of the vehicle forms the corner 73. Each outer surface 186, 187 lies parallel to a facing opposite wall 71, 72. The outer surfaces 186, 187 are inclined to one another with the same angle as the two opposite walls 71, 72. Preferably the angle of inclination between the outer surfaces 186, 187 is comprised between 90° and 180°. As previously explained this configuration results first in a compact arrangement.

Besides, this arrangement allows air flowing through the pre-separator 18 to be deviated around said corner 73. The inventors have found that the deviation of the air flow along corner curvature 73 also results on a beneficial effect for particles separation and noise attenuation.

For better noise attenuation, the specific arrangement described just above can be combined with side walls 182 made of noise insulating material and the chicane arrangement 183 inside the channel 188.

Advantageously, the side walls 182 and the inside separator wall 183 are resiliently deformable in a compression in order to ensure a sealing contact between on the one hand the side walls 182 and the inside separator wall 183 and on the other hand the opposite wall(s) 7. This characteristic is beneficial especially when the opposite wall 71, 72 is a body panel of the vehicle manufactured separately from the rest of the engine air filter unit 10.

Indeed, when the opposite wall 7 is a body panel of the vehicle the fact that it is manufactured separately from the rest of the engine air filter unit 10 increases the plays of assembly between the engine air filter unit 10 and the opposite wall 7. Having side walls 182 and the inside separator wall 183 which are resiliently deformable allow plays of assembly being compensated by resilient deformation of the side walls 182 and of the inside separator wall 183 in order to ensure when assembled perfect sealing contact between both parts. Side walls 182 and inside separator wall 183 can be made of a resiliently deformable material, for instance, chosen among polyurethane foams.

It is to be understood that the present invention is not limited to the embodiments described above and illustrated in the drawings; rather, the skilled person will recognize that many changes and modifications may be made within the scope of the appended claims.

In particular, although engine air filter unit 10 is represented in a construction equipment vehicle, the engine air filter unit 10 can be used in any king of vehicles provided with an internal combustion engine and with an engine air filter unit to supply in filtered air the internal combustion engine.

The invention claimed is:

1. An engine air filter unit for a vehicle that is designed to supply filtered air to an internal combustion engine of the vehicle, the engine air filter unit comprising:
   a main filter having
   a filter housing delimiting an inside of a filtration chamber of the main filter,
   a filter element arranged inside the filtration chamber, a mounting base connected to the filter housing of the main filter in order o secure the engine air filter unit on at least one body panel of the vehicle,
   a pre-separator fluidically connected to the main filter, arranged upstream from the main filter and comprising a pre-separator housing, wherein the pre-separator housing is partly formed by the mounting base and by side walls that extend from the mounting base in a direction opposite to the main filter, the pre-separator housing is closed, irrespective of an air inlet and an air outlet of the pre-separator housing, by at least one opposite wall that is facing to at least one outer surface of the mounting base and that lies parallel to the at least one outer surface of the mounting base, wherein the side walls extend from the at least one outer surface of the mounting base to the at least one opposite wait, and
   an air duct fluidically connecting the pre-separator to the filtration chamber, wherein
   the main filter is arranged on a side of the mounting base and the pre-separator is arranged on the opposite side of the mounting base, wherein the air duct extends through the mounting base to fluidically connect the pre-separator to the filtration chamber.

2. The engine air filter unit according to claim 1, wherein the side walls extend perpendicularly from at least one outer surface of the mounting base, wherein the at least one outer surface is on a side of the mounting base that is opposite to the side where is arranged the main filter.

3. The engine air filter unit according to claim 2, wherein the at least one outer surface of the mounting base is a flat surface, a curve surface, several flat surfaces inclined relative to each other or a succession of flat and curve surfaces.

4. The engine air filter unit according to claim 2, wherein the mounting base is formed by at least one mounting plate.

5. The engine air filter unit according to claim 2, wherein the filter housing is made of at least one plastic part or is made of at least one metallic alloy part and the mounting base is formed as a single piece with the plastic part or metallic alloy part.

6. The engine air filter unit according to claim 1, wherein the at least one opposite wall has an outer surface opposite to the mounting base that is designed to fit with an inner shape of the at least one body panel of the vehicle.

7. The engine air filter unit according to claim 6, wherein the at least one outer surface of the at least one opposite wall has the same shape as the inner shape of the at least one body panel of the vehicle.

8. The engine air filter unit according to claim 1, wherein the at least one opposite wall forms the at least one body panel of the vehicle.

9. The engine air filter unit according to claim 2, wherein, when the engine air filter unit is secured on said at least one body panel, the pre-separator housing is designed to be closed, irrespective of its air inlet and its air outlet, by said at least one body panel of the vehicle, wherein the at least one body panel contacts the side walls of the pre-separator housing such that the side walls extend from the mounting base to the at least one body panel.

10. The engine air filter unit according to claim 9, wherein, when the engine air filter unit is secured on the at least one body panel of the vehicle, the at least one body panel forms the at least one opposite wall of the pre-separator housing that is facing to the at least one outer surface of the mounting base and that lies parallel to the at least one outer surface of the mounting base.

11. The engine air filter unit according to claim 1, wherein the at least one outer surface of the mounting base has the same shape as the at least one opposite wall.

12. The engine air filter unit according to claim 1, wherein an air inlet of the pre-separator is formed in the at least one opposite wall and an outlet of the pre-separator is formed by an opening of the air duct that opens inside the pre-separator housing.

13. The engine air filter unit according to claim 3, wherein the at least one outer surface of the mounting base comprises two outer surfaces facing to two opposite walls of the at least one opposite wall that are inclined relative to each other with an angle comprising between 90 and 180° and the outer surfaces are inclined relative to each other with the conjugate angle relative to the angle of the two opposite walls.

14. The engine air filter unit according to claim 1, wherein the pre-separator comprises, inside the pre-separator housing, a particle separating device to trap particles contained in an air flow that is flowing through the pre-separator.

15. The engine air filter unit according to claim 14, wherein the particle separating device comprises a channel arranged between the air inlet and the air outlet of the pre-separator and at least one chicane to deviate the air flow flowing through the channel.

16. The engine air filter unit according to claim 15, wherein the at least one chicane is formed by at least one inside separator wall extending from the mounting base to the at least one opposite wall.

17. The engine air filter unit according to claim 16, wherein the side walls and the at least one inside separator wall are formed by noise insulating material.

18. The engine air filter unit according to claim 16, wherein the side walls and the at least one inside separator wall are resiliently deformable in a compression.

19. The engine air filter unit according to claim 1, wherein the pre-separator housing has a thickness measured between the at least one outer surface of the mounting base and the at least one opposite wall that is at least five times lower than the width or the length of the pre-separator housing along the at least one outer surface of the mounting base.

20. A vehicle comprising:
an internal combustion engine,
an engine air filter unit according to claim 1,
an engine compartment wherein the internal combustion engine and the engine air filter unit are arranged, the engine compartment being at least partially delimited by the at least one body panel of the vehicle, wherein the engine air filter unit is secured to the at least one body panel via its mounting base, the pre-separator housing is at least delimited by the mounting base, by the at least one body panel and by side walls extending from the mounting base to the at least one body panel.

21. The vehicle according to claim 20, wherein the pre-separator is arranged in a corner inside the engine compartment, wherein the corner is formed at the junction of at least a first body panel portion and a second body panel portion of the at least one body panel that are inclined relative to each other and delimiting at least partially the engine compartment, wherein the pre-separator housing is at least delimited by:
the mounting base,
the first body panel portion and the second body panel portion, and
the side walls that extend from the mounting base to the first and second body panel portions.

22. The vehicle according to claim 21, wherein the mounting base comprises a first outer surface and a second outer surface facing respectively to the first body panel portion and to the second body panel portion, wherein the first outer surface and the second outer surface are inclined relative to each other with the same angle as an angle of inclination between outer surfaces of the first body panel portion and the second body panel portion.

23. The vehicle according to claim 22, wherein the first body panel portion and the second body panel portion are inclined relative to each other with an angle comprising between 90 and 180°.

24. The vehicle according to claim 22, wherein the air outlet of the pre-separator is formed in the first outer surface of the mounting base that is facing to the first body panel portion and the air inlet of the pre-separator is formed in the second body panel portion.

25. The vehicle according to claim 22, wherein the first body panel portion and the second body panel portion belong to the same body panel or belong to two different body panels.

* * * * *